Oct. 5, 1926.  
J. H. CHANDLER  
1,602,337  
SPRING SUSPENSION FOR VEHICLES  
Filed Sept. 15, 1923    5 Sheets-Sheet 2

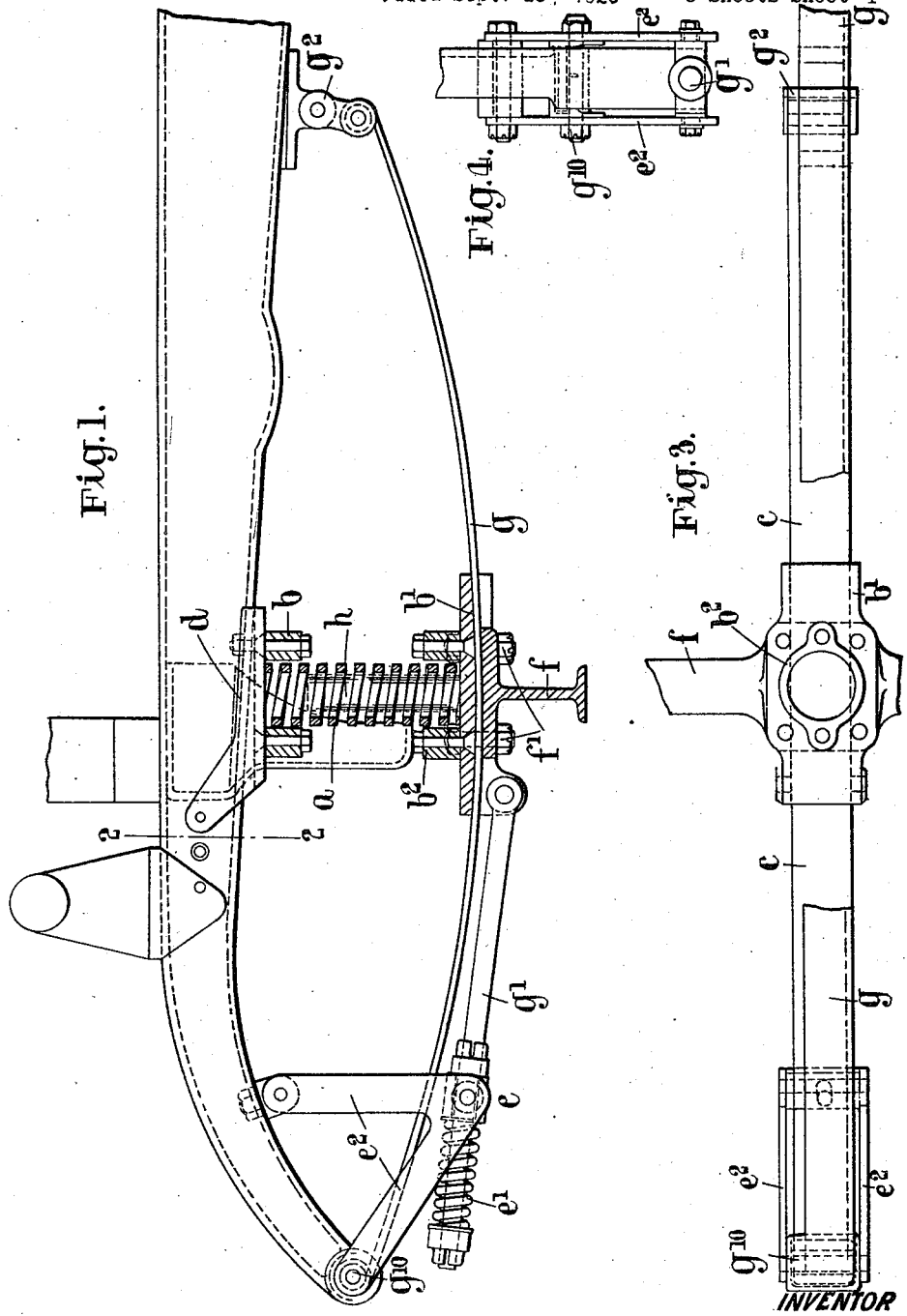

INVENTOR  
James Henry Chandler  
ATTORNEY:

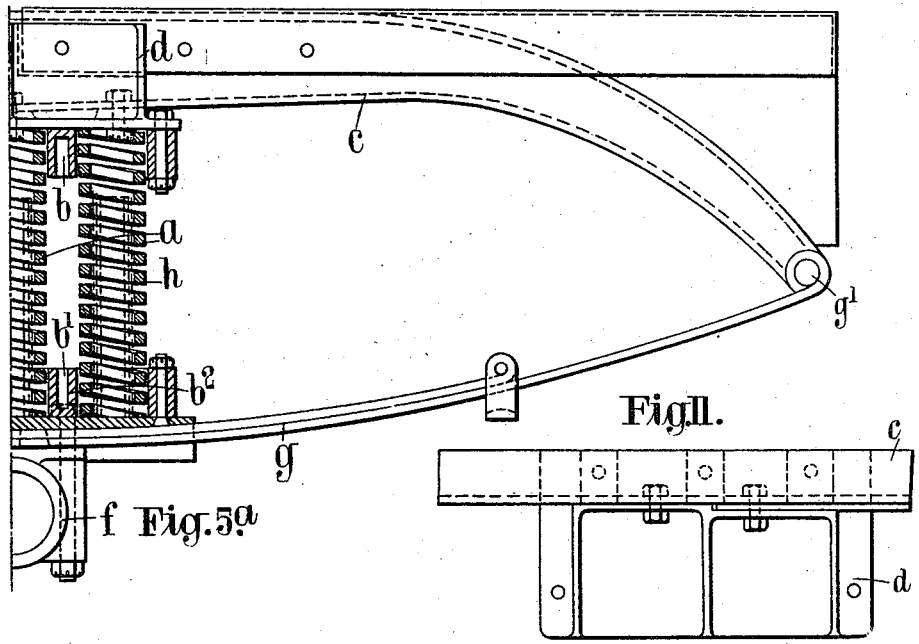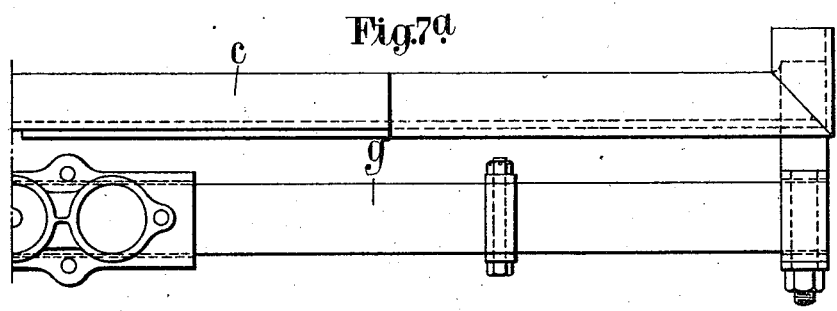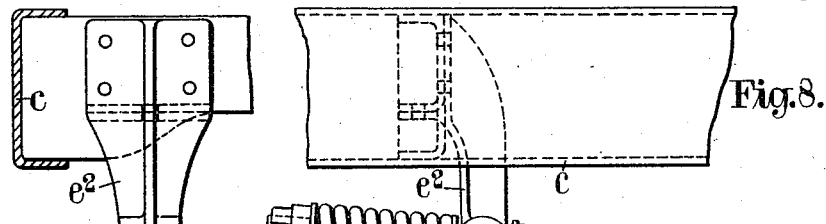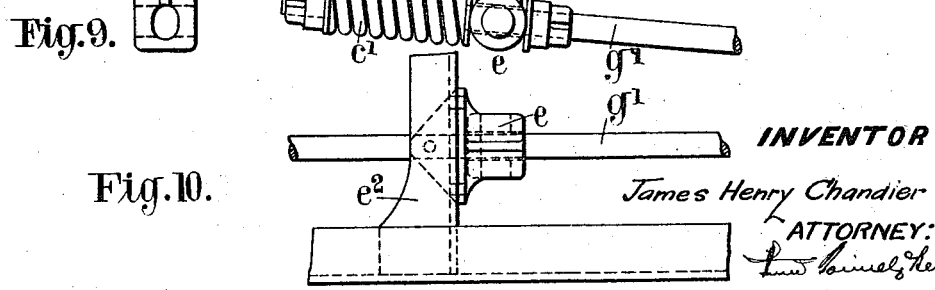

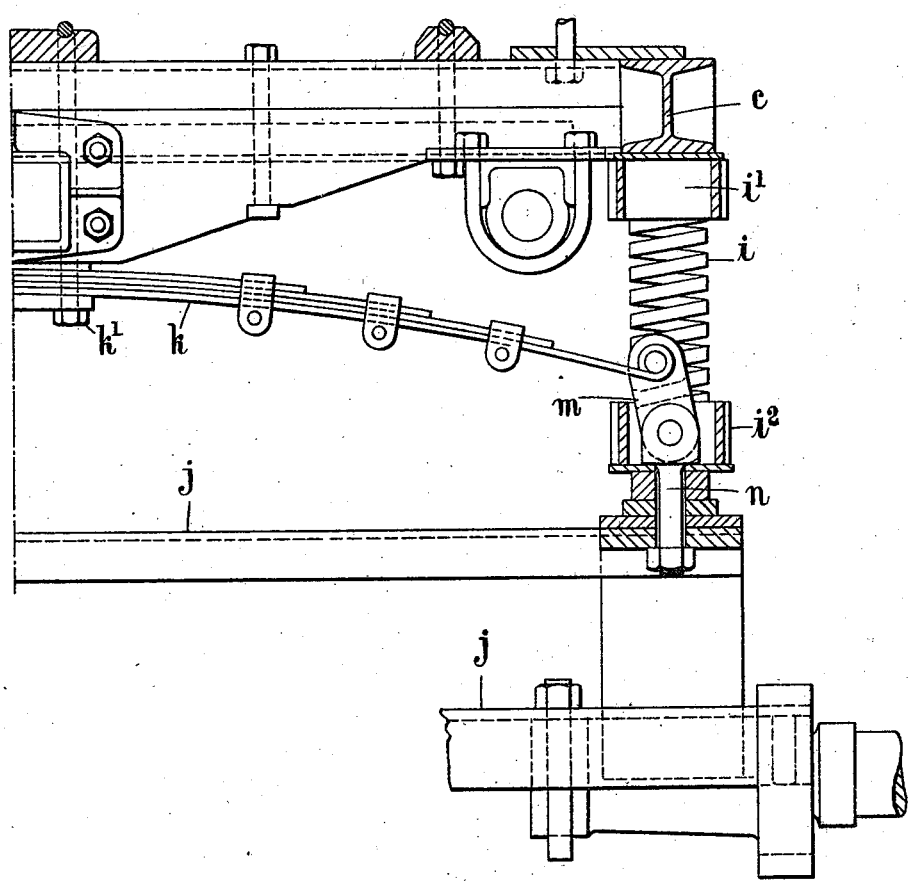

Patented Oct. 5, 1926.

1,602,337

UNITED STATES PATENT OFFICE.

JAMES HENRY CHANDLER, OF LONDON, ENGLAND.

SPRING SUSPENSION FOR VEHICLES.

Application filed September 15, 1923, Serial No. 662,975, and in England September 19, 1922.

This invention relates to spring suspensions for vehicles, and more particularly to suspensions of the general type embodying vertical helical springs located side by side between the vehicle frame or equivalent member and an axle supporting member, and having their opposite ends housed in said members, and a spring compensating device adapted to ensure return of said helical springs to normal condition after absorption of shock.

The present invention relates to improvements in such a spring suspension of the type referred to, whereby it may be readily adapted or applied to existing vehicles generally and particularly to those which are commonly suspended on laminated springs.

Such improved suspension device provides, with a vehicle fitted with solid tyres, the same comfort for passengers as those fitted with pneumatic tyres, and where the latter are provided, increases the life thereof.

According to this invention the improved suspension comprises one or more vertical springs, preferably of the helical type, combined with one or more laminated or horizontal springs at each side of the vehicle for each axle or equivalent, the said two classes of springs being so related that the vertical spring or springs carry all or substantially all the load, and the horizontal or laminated spring or springs is or are substantially free from traffic effort and act to damp the vibrations of said vertical spring or springs.

The invention also comprises other combinations of parts and details of construction and arrangement all as hereinafter fully described and pointed out in appended claims.

Figure 5:
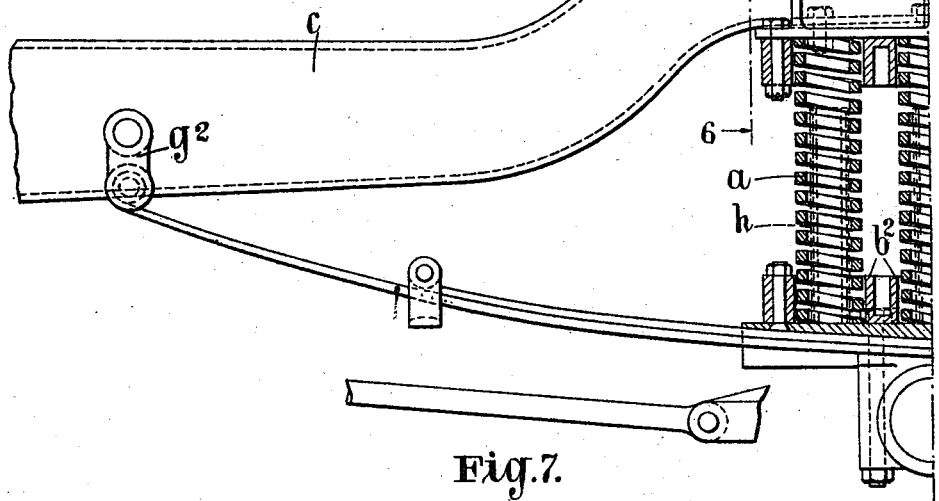
Figure 7:
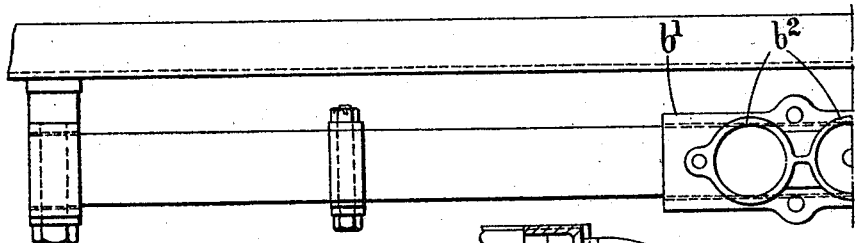
Figure 2:
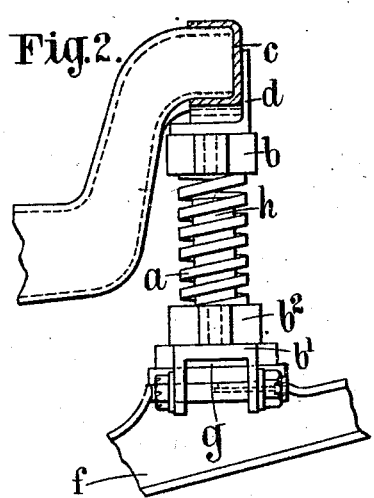
Figure 6:
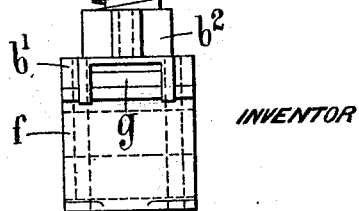
Figure 12:
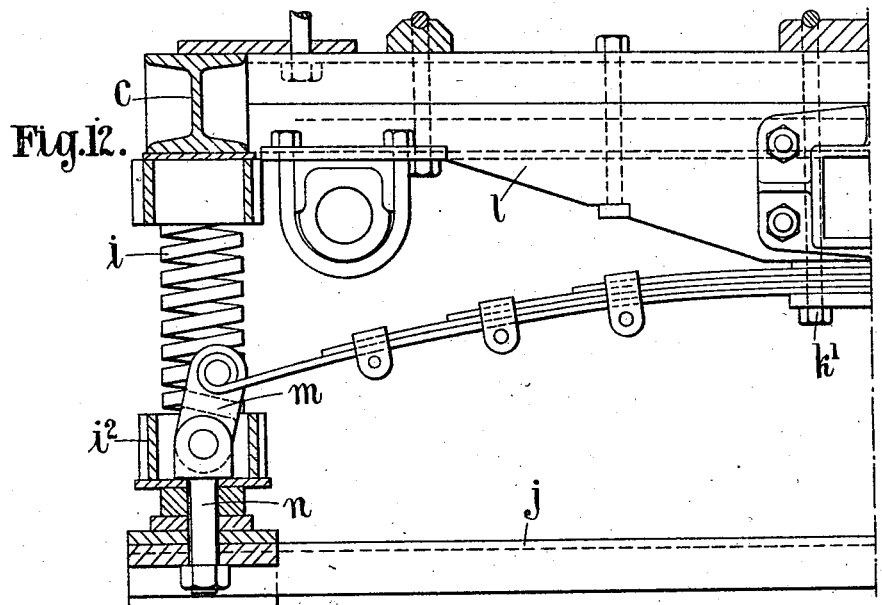
Figure 13:
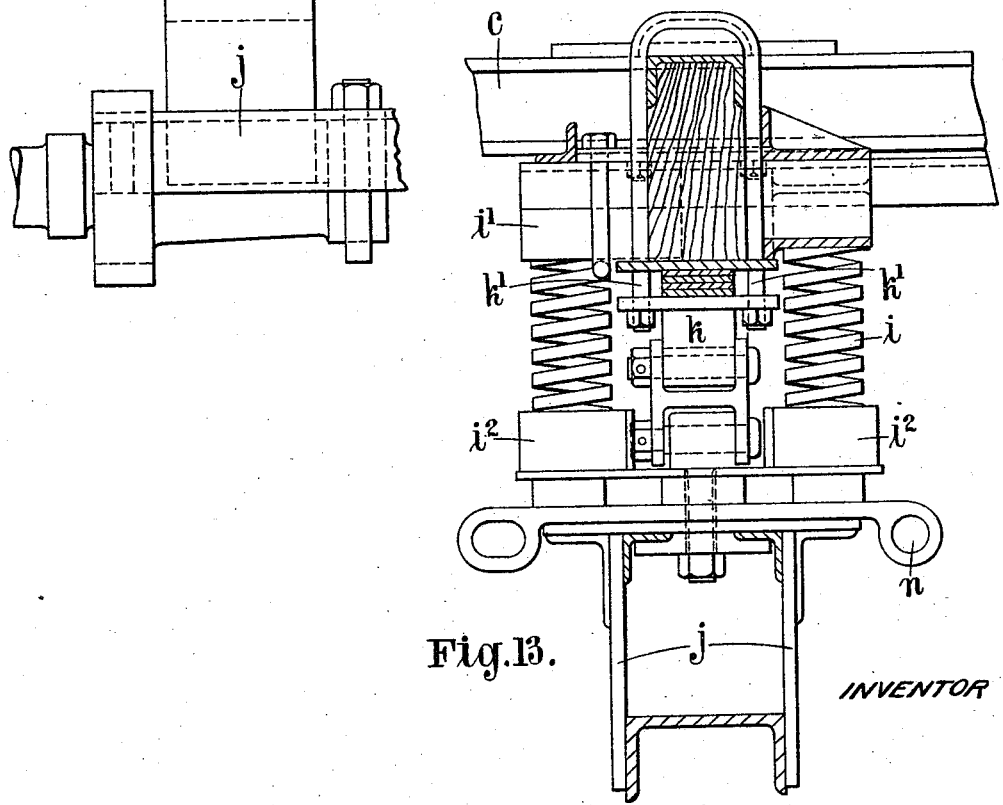

In the accompanying drawings Fig. 1 is a sectional side elevation of one embodiment of the invention. Fig. 2 is a section on the line 2—2 of Fig. 1. Fig. 3 is a plan view with the upper spring housing and bracket (hereinafter described) removed. Fig. 4 is a partial end view from the left of Fig. 1. Figs. 5 and 5ª jointly constitute a part sectional side elevation of a second embodiment. Fig. 6 is a section on line 6—6 of Fig. 5. Figs. 7 and 7ª jointly constitute a plan view of Fig. 5 with the upper spring housing and bracket removed. Fig. 8 is a side elevation of a compensating device shown detached but normally in position in continuation of the left hand of Fig. 5. Fig. 9 is a partial end view of Fig. 8 from the left. Fig. 10 is a plan view of Fig. 8 and Fig. 11 is a detail plan view of the bracket and upper spring housing. Figs. 12 and 12ª jointly constitute a part sectional side elevation of a modification showing an arrangement of transverse laminated springs and Fig. 13 is a view, with parts in section, taken at right angles to Fig. 12.

As shown in the drawings one or more vertical springs $a$ are used at each side of the vehicle and may be of spiral, helical or other suitable form. In Fig. 1 a single spring is shown and in Fig. 5 three such springs carried at opposite ends in housings $b$, $b^1$, the upper one $b$ of which is secured by means of a bracket $d$ to the vehicle chassis $c$. A compensating device $e$ is also provided, but is applied for the purpose of transmitting the pulling strain, besides being adapted, when necessary or desired, to act for the same purpose and in the same manner as in the known arrangements.

In the present improvements, however, flexibility between the respective axle centres and the absorption of both horizontal and vertical shocks by the vertical spring or springs $a$ are obtained in the following manner:

Instead of the absorption of the traffic shocks being directly effected by the vertical springs, the axle-tree $f$ or equivalent member employed, is connected by bolts $f^1$ or other convenient means to the lower housing $b^1$ which supports and carries the cup $b^2$ receiving the lower end of said vertical spring $a$. This housing is held in position by a laminated spring $g$ which can be either fixed to the housing or have a sliding movement in relation thereto (as may be found desirable) and is connected by rod $g^1$ to the compensating device $e$ with or without adjustable means such as spring $e^1$ which is pivotally supported or carried by a bracket $e^2$ depending from the chassis $c$. The compensating device, when provided with an adjustable spring, as illustrated, serves the purpose of restoring the axle-tree or equivalent to normal position when the wheels pass over an obstruction, but also co-operates in the absorption of horizontal shocks. When the compensating device is not provided with an adjustable spring, the flexibility between the respective axle centres or deflection of the axle-centres is obtained, although in a lesser degree, by the application of rigid radius rods and the laminated spring $g$. No traffic pull or tractive effort is thus transmitted either through the vertical spring or springs $a$ or the laminated spring $g$.

Owing to the special design and manner of arrangement of the aforesaid lower housing $b^1$ the laminated spring $g$ is relieved of traffic pull and to a great extent of the effects of traffic shock or load. The said spring $g$ is anchored at opposite ends to the vehicle frame; for example at one end to a pin or bolt $g^{10}$ and at the opposite end by a rocker or shackle $g^2$. As the said spring is not subjected to any undue strains or distortion, it may comprise a single leaf as in Fig. 1 or several leaves, two such being shown in Fig. 5, or a considerable number as in Fig. 12; and therefore is very much lighter and more flexible than if made to carry the full load. The introduction of the said laminated spring $g$ in the manner described and the greater flexibility of same thus obtained, eliminates the use of the brackets and link connections commonly employed in this class of suspension. The said laminated spring also acts to maintain the axles of the vehicle in parallel alignment and provides means for laterally stabilizing the vehicle.

There is thus provided a spring suspension which combines two different forms of spring viz helical or the like $a$ (vertical) and laminated $g$ (horizontal), one system counteracting the detrimental effects and functions of the other; for instance, the helical spring or springs which can be made very flexible are liable to cause oscillation under certain traffic conditions, but such oscillation will be counteracted by the resilient laminated spring mentioned. The most advantageous properties of each system may therefore be utilized and results obtained which cannot be produced by the use of one or other of said systems separately.

With the object of securing greater safety in case of accident, a spindle or stopper $h$ is provided within each vertical spring $a$ secured to the lower housing $b^1$ and extending upwards within the spring for a certain distance. In case of spring or coil of a spring breaking, this spindle $h$ will retain the spring in function. The spindle may be of any suitable material and if of steel, its ends may be provided with a rubber (or any other resilient material) cap or in lieu thereof a shorter vertical spring may be used which also provides the necessary resilience under heavier loads.

A construction as above described results in a spring suspension of unique design applicable to any type of vehicle whether animal-drawn, self-propelled or trailed. It is further adapted to replace the usual laminated spring suspension without necessitating any structural alterations of the vehicle frame or chassis and provides amongst other novel features a laminated spring which is substantially free of traffic effort and whose function is not to support the load, but to act as a damper on the vibration of the load-carrying helical spring or springs. The compensating device, when fitted with an adjustable spring, also allows the pressure to be regulated or varied at will, and the stopper in the form of a solid cylindrical member or spring affords a safety device, all as explained above.

In the modification of the above arrangements shown in Figs. 12 and 13, a combination of helical or vertical springs and laminated leaf or horizontal springs may be employed in which the latter is or are disposed transversely of the vehicle, this combination counteracting the rebounding effect produced by the helical spring or springs alone and securing a greater lateral stabilization of the vehicle.

In the construction illustrated of such an arrangement two vertical helical springs $i$ carried substantially as hereinbefore described in upper and lower housings $i^1$, $i^2$ respectively are mounted one at each side of the axis of the axle-tree $j$ with their ends housed in guide cups or otherwise suitably mounted. Between said helical springs is located a transverse laminated or leaf spring $k$ firmly connected at or about its centre as by bolts $k^1$, to a cross member $l$ of the vehicle chassis $c$ and with its outer ends connected to shackles or links $m$ which in turn are secured by bolts $n$ to the axle-tree $j$ or equivalent between said vertical helical springs $i$. The spring suspension as a whole viz the combined helical and laminated springs, is thus disposed symmetrically with regard to the axis of the axle or equivalent and tends to act efficiently in the manner above stated, the effect being in this and in the arrangements first described that the laminated spring $k$ takes up but a small portion of the load carried by the helical spring or springs $i$ and that the latter deal only with vertical shocks, the combined effect being that the laminated spring is relieved of the greater portion of its duty as compared with ordinary laminated spring suspension.

What I claim as my invention and desire to secure by Letters Patent of the United States is:—

1. A spring suspension for vehicles, comprising, in combination with an axle, a vertical spring and a horizontal spring located at each side of the vehicle, and a radius member interposed between the axle and a stationary vehicle member; said springs and radius member being so related that the vertical springs carry the bulk of the load and absorb both vertical and horizontal shocks, the radius member relieves both the vertical and the horizontal springs of tractive effort, and the horizontal springs act solely to damp the vibrations of the vertical springs.

2. A spring suspension for vehicles, comprising, in combination with the front and rear axles, a vertical helical spring and a horizontal laminated spring located at each side of the vehicle for each axle, and a compensating device including a spring loaded radius member interposed between each axle and a stationary vehicle member; the said springs and radius member being so related that the vertical helical springs carry approximately all the load and absorb both vertical and horizontal shocks, the horizontal laminated springs act solely to damp the vibrations of said vertical springs, and the radius member absorbs horizontal shock and relieves said vertical and horizontal springs of tractive effort.

3. A spring suspension for vehicles, comprising, in combination, an axle, a vertical helical spring interposed between said axle and the frame of the vehicle, a bearing member secured to the axle, a horizontal laminated spring traversing said bearing member and having movement in relation thereto and mounted at its ends on the vehicle frame, and a radius member including a resilient element interposed between said axle and frame member; the said springs and radius member being so related that the vertical helical spring carries approximately all the load and absorbs both vertical and horizontal shocks, the horizontal laminated spring acts solely to damp the vibrations of said vertical spring, and the radius member absorbs horizontal shock and relieves said vertical and horizontal springs of tractive effort.

4. A spring suspension for vehicles, comprising, in combination, an axle, a vertical helical spring interposed between said axle and the frame of the vehicle, a bearing member secured to the axle, a spindle secured to said bearing member and extending within the vertical spring for a substantial distance, a horizontal laminated spring traversing said bearing member and having movement in relation thereto and mounted at its ends on the vehicle frame, and a radius member including a resilient element interposed between said axle and frame member; the said springs and radius member being so related that the vertical helical spring carries approximately all the load and absorbs both vertical and horizontal shocks, the horizontal laminated spring acts solely to damp the vibrations of said vertical spring, and the radius member absorbs horizontal shock and relieves said vertical and horizontal springs of tractive effort.

5. A spring suspension for vehicles, comprising, in combination with the front and rear axles, a vertical helical spring and a horizontal laminated spring located at each side of the vehicle for each axle, said laminated spring being disposed transversely of the vehicle symmetrically to said axle, and a radius member including a resilient device interposed between the axle and the vehicle frame; the said springs and radius member being so related that the vertical helical springs carry approximately all the load and absorbs both vertical and horizontal shocks, the horizontal laminated springs act solely to damp the vibrations of said vertical springs, and the radius member absorbs horizontal shock and relieves said vertical and horizontal springs of tractive effort.

In witness whereof I have signed this specification.

JAMES HENRY CHANDLER.